United States Patent [19]

Tobias et al.

[11] 4,238,583
[45] Dec. 9, 1980

[54] THERMOSETTABLE POLYESTER RESIN COMPOSITIONS

[75] Inventors: Michael A. Tobias, Bridgewater; Conrad L. Lynch, Edison, both of N.J.

[73] Assignee: Mobil Oil Corporation, New York, N.Y.

[21] Appl. No.: 58,966

[22] Filed: Jul. 20, 1979

Related U.S. Application Data

[63] Continuation-in-part of Ser. No. 928,341, Jul. 27, 1978.

[51] Int. Cl.³ .................. C08G 63/76; C08G 63/18
[52] U.S. Cl. .................. 525/443; 260/40 R; 427/385.5; 528/302; 528/308
[58] Field of Search .......... 528/272, 302, 308; 525/443; 427/385 R; 260/40 R

[56] References Cited

U.S. PATENT DOCUMENTS

| | | | |
|---|---|---|---|
| 3,678,128 | 7/1972 | Riemhofer et al. ............ | 525/443 |
| 3,804,920 | 4/1974 | Cunningham et al. .......... | 525/443 |
| 3,852,375 | 12/1974 | Biethan et al. ............... | 260/31.8 T |
| 3,957,709 | 5/1976 | Holzrichter et al. .......... | 260/29.4 R |
| 4,113,793 | 9/1978 | Sekmakas .................. | 260/33.4 R |
| 4,123,404 | 10/1978 | Lasher ..................... | 260/29.4 R |

*Primary Examiner*—Lucille M. Phynes
*Attorney, Agent, or Firm*—Charles A. Huggett; Ronald J. Cier

[57] ABSTRACT

There are disclosed thermosettable polyester resins which are the reaction products of specified amounts of a benzenedicarboxylic acid component (e.g.: 1,3-benzenedicarboxylic acid), a trihydroxy alkyl component (e.g.: 2-ethyl-2-(hydroxymethyl)-1,3-propanediol), a short chain alkylene diol component having four or fewer carbon atoms in the primary carbon chain between the hydroxyl moieties (e.g.: 2,2-dimethyl-1,3-propanediol), a dihydroxy alkyl constituent having four to ten carbon atoms in the primary carbon chain between the hydroxyl moieties (e.g.: 1,6-hexanediol), and optionally, an alkyl dicarboxylic acid component (e.g.: 1,6-hexanedioic acid). Such polyesters, having a number average molecular weight of from about 400 to about 1400, a combined acid and hydroxyl number of about 50 to about 250 milligrams of KOH per gram of polyester, and a glass transition temperature of about $-15°$ to $+25°$ C., are found to be especially useful in high solids content coating formulations.

25 Claims, No Drawings

THERMOSETTABLE POLYESTER RESIN COMPOSITIONS

CROSS-REFERENCE TO RELATED APPLICATION

This is a continuation-in-part of copending U.S. application Ser. No. 928,341, filed July 27, 1978.

BACKGROUND OF THE INVENTION

Field of the Invention

This invention is concerned with thermosettable, highly aromatic polyester resins and coating compositiions based on such resins.

SUMMARY OF THE INVENTION

We have discovered a new and useful type of polyester resin compositions which, when combined with a suitable solvent and appropriate adjuvants, provide thermosettable coating compositions of superior qualities which are particularly well suited for appliance coating applications. The resins are the polyester condensation products of a reaction mixture comprising:
  (a) about 40% to about 60% by weight benzenedicarboxylic acid [e.g.: 1,3-benzenedicarboxylic acid];
  (b) about 2% to about 18% by weight of a trihydroxy alkyl component [e.g.: 2-ethyl-2-(hydroxymethyl)-1,3-propanediol];
  (c) about 9% to about 23% by weight of a short chain alkylene diol component having four or fewer carbon atoms in the primary carbon chain between the hydroxyl moieties [e.g.: 2,2-dimethyl-1,3-propanediol];
  (d) about 9% to about 30% by weight of a dihydroxy alkyl compound having four to ten carbon atoms in the primary carbon chain between the hydroxyl moieties [e.g.: 1,6-hexanediol]; and
  (e) 0% to about 10% by weight of an alkyl dicarboxylic acid component [e.g.: 1,6-hexanedioic acid].

The monomers are combined in ratios substantially within the stated ranges, such that the resulting polyester has a number average molecular weight of from about 400 to about 5000, a combined acid and hydroxyl value of about 40 to about 250 milligrams of KOH per gram of polyester, and a glass transition temperature of about $-15°$ C. to $+25°$ C.

The highly aromatic polyester resins disclosed herein are readily solvated in conventional coating composition solvent vehicles to form stable coating solutions. When combined with an appropriate aminoplast and acid catalyst, such coating solutions may be applied to a suitable substrate and cured to produce coatings exhibiting an outstanding combination of hardness, adhesion, stain resistance, water resistance, extendability and dry heat resistance.

Resins having a number average molecular weight of from about 400 to about 1400, a combined acid and hydroxyl value of about 50 to about 250 milligrams of KOH per gram of polyester, and a glass transition temperature of about $-15°$ C. to $+25°$ C. are found to be particularly useful in the formulation of high solids level coating compositions. Such high solids coatings have the same general utility as lower solids level compositions—e.g.: appliance coatings and other general metal applications—but have the additional benefit of lower solvent content and significantly reduced volatile emissions. Useful high solids compositions based on the foregoing lower MW resins may contain between about 25 wt % and about 60 wt % on resin solids of an aminoplast, between about 0 and 1.0 wt % on resin solids of an acid catalyst and an inert organic solvent in an amount sufficient to provide a solids content of between about 55 wt % and about 100 wt % based on the total weight of the coating composition. Preferred high solids level coating compositions will contain from about 75 to about 100 wt % solids in the final formulation before the addition of a pigmenting agent.

DESCRIPTION OF SPECIFIC EMBODIMENTS

Polyester Resins

The benzenedicarboxylic acid component of the polyester resins of the present invention is preferably one of the nonsymmetrical isomers of that compound, and most preferred is 1,3-benzenedicarboxylic acid [isophthalic acid]. 1,2-Benzenedicarboxylic acid [phthalic acid], or its anhydride, may also be used to advantage as the aromatic acid component, either by itself or in combination with 1,3-benzenedicarboxylic acid. The benzenedicarboxylic acid component is used in an amount between about 40 percent and about 60 percent by weight of the reaction mixture, based on the total weight of the reactants.

The trihydroxy alkyl component may be a linear or branched hydrocarbon compound and the three hydroxyl functions are attached to either terminal or to nonterminal carbon atoms in the molecule. It has been found that triol compounds having an internal tertiary carbon atom in the hydrocarbon skeleton, such that each of the hydroxyl groups is on a different terminal carbon atom, result in the most desirable configurations for the polyester product. For this reason the preferred trihydroxy compounds are those exemplified by 2-ethyl-2-(hydroxymethyl)-1,3-propanediol [trimethylolpropane; TMP] and 2-(hydroxymethyl)-2-methyl-1,3-propanediol [trimethylolethane; TME; pentaglycerol]. The trihydroxy alkyl component is used in an amount between about 2 percent and about 18 percent by weight of the reaction mixture, based on the total weight of the reactants.

The preferred short chain alkylene diol component, which constitutes between about 9 percent and about 23 percent by weight of the reaction mixture, comprises one or more of those short chain alkylene diol compounds having four or fewer carbon atoms in the hydrocarbon chain between the two hydroxy groups. It is preferred that this diol component be 2,2-dimethyl-1,3-propanediol [neopentyl glycol], either by itself or in admixture with other short chain alkylene diol components. Other diol compounds (such as 1,2-ethanediol, 1,2-propanediol and 1,3-butanediol) are similarly useful in the preparation of the resins disclosed herein and are preferably used in admixture with 2,2-dimethyl-1,3-propanediol.

The second dihydroxy component of the polyester resins of this invention comprises a dihydroxy alkyl compound having four to ten carbon atoms in the primary carbon chain between the two hydroxyl groups. The preferred compound is 1,6-hexanediol [hexamethylene glycol], but other similar compounds wherein the hydroxyl groups are separated by a chain of four to ten carbon atoms may be successfully substituted therefore. Examples of other useful compounds include, but are not limited to: 1,4-butanediol; 1,5-pentanediol; 1,7-heptanediol; 1,8-octanediol; 1,9-nonanediol; and 1,10- decanediol. This component is used in an amount between about 9 percent and about 30 percent by weight of the reaction mixture, based on the total weight of the reactants.

An alkyl dicarboxylic acid component, such as 1,6-hexanedioic acid, may optionally be included in the formulation. When included, such constituent is preferably in the range of 0 percent to about 10 percent by weight of the reaction mixture and replaces a corresponding portion of the aromatic acid component.

The esterification reaction is normally carried out at temperatures between about 175° C. and about 250° C., for a period of time ranging between about 3 hours and about 10 hours. A conventional catalyst for the promotion of esterification reactions, such as dibutyltin oxide, dibutyltin dilaurate, or triphenyl phosphite, can be used in catalytic amounts (e.g.: 0.01 to 1.0 percent by weight) to aid in the reaction. During the reaction it is advantageous to remove the water evolved from the esterification, for instance by means of a suitable trap which condenses and draws off the water vapors, by azeotropic distillation with toluene or xylene, or by flushing the reactor with an inert gas to sweep the vapors away from the reactants. The reactants are combined in appropriate relative amounts, substantially within the specified ranges, such that the polyester product of the above reaction process is a substantially noncrystalline resin material having a number average molecular weight of from about 400 to about 5000, combined acid and hydroxyl values of about 40 to about 250 milligrams of KOH per gram of polyester, and a glass transition temperature of about $-15°$ to $+25°$ C.

Polyester resins within the approximate number average MW range of 400 to 1,400 and having combined acid and hydroxyl values of about 50 to about 250 milligrams of KOH per gram of polyester are especially beneficial in the formulation of desirable high solids level coating compositions—i.e. those having a total solids content within the approximate range of 55 to 100 weight percent and preferably about 75–100 weight percent. The relatively higher MW resins, that is those having a number average MW of about 1,400 to 5,000 and combined acid and hydroxyl values of about 40 to 160 milligrams of KOH per gram of polyester, have significant utility in the formulation of the more conventional solids level coatings—i.e. coating compositions having from about 35 to 55 weight percent of solids in the formulation.

Coating Compositions

The essential components of the coating compositions of this invention are the foregoing polyester resin, an aminoplast, an acid catalyst, and an inert organic solvent.

The material used to thermoset the coating is a conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins, and other aminoplast-aldehyde resins such as those triazine resins produced by the reaction of an aldehyde with formoguanamine, ammeline, 2-chloro-4,6-diamino-1,3,5-triazine, 6-methyl-2,4-diamino-1,3,5-triazine, 2,4,5-trihydrazine-1,3,5-triazine, and 2,4,6-triethyl-triamino-1,3,5-triazine. Generally, such resins are alkylated with an alcohol, such as methanol or butanol. As aldehydes used to react with the amino compounds to form the resinous material, one may use such compounds as formaldehyde, acetaldehyde, crotonaldehyde, acrolein, or compounds which engender aldehydes, such as hexamethylene-tetramine, paraldehyde, paraformaldehyde, and the like. The amount of aminoplast used is preferably between about 5 weight percent and about 25 weight percent on resin solids in the case of conventional solids level compositions and between about 25 weight percent and about 60 weight percent on resin solids in high solids level compositions.

The acid catalyst may be the acid itself or a derivative that will generate the acid in situ, such as commercially available Aerosol OT which generates sulfonic acid and ammonium nitrate which can be decomposed to form nitric acid. Acids that generally are used to cure aminoplast systems include p-toluenesulfonic acid (pTSA), benzenesulfonic acid, methylsulfonic acid, cyclohexyl sulfonic acid, phosphoric acid, mono- or dialkyl acid phosphates, and many others indicated in the art as suitable curing catalysts. The amounts of acid catalyst used is usually between about 0 weight percent and about 1.0 weight percent, based upon total resin solids.

The solvents utilizable in the coating compositions of this invention are the usual volatile solvents used in paints and enamels. Aromatic hydrocarbons are useful, such as toluene, xylene, and aromatic petroleum cuts, e.g.: Hi-Sol 4-1 (boils 190.6°–260.0° C.) and Solvesso 100 (boils 155.6°–172.2° C.). Useful ketones include methyl isobutyl ketone (MIBK), isophorone, ethyl amyl ketone, and methyl n-amyl ketone. Alcohols are utilizable, such as butanol, amyl alcohol, 2-ethylhexanol, and cyclohexanol. Also of use are the ether alcohols and their acetate esters, such as methoxyethanol, ethyoxyethanol, butoxyethanol, hexoxyethanol, methoxypropanol, methoxyethyl acetate, and ethoxyethyl acetate. It is within the contemplation of this invention to use mixtures of two or more solvents. The proportion of solvents included is not critical, since they primarily serve as the volatile vehicle to convey the solid material to the substrate to be coated. The total amount of solvents used will be sufficient to provide a solids content (% NVM) in the so-called conventional embodiment of the compositions of this invention of between about 35 weight percent and about 55 weight percent in the coating composition prior to pigmentation. In the high solids level embodiment the total amount of solvents used should be sufficient to provide a final solids content of about 55 to 100 weight percent, and preferably between about 75 and 100 weight percent prior to pigmentation.

It is preferred to incorporate a pigment into the coating compositions of this invention. The preferred white pigment is titanium dioxide, but any conventional pigment can be used, such as zinc oxide, bentonite, silica, and chrome yellows, greens, oranges, etc. Sufficient pigment is included to provide an opaque or colored film of the desired intensity and appearance.

The coating compositions of this invention may be applied to any of the usual substrates, i.e.: metal, paper, leather, cloth, etc., using any of the usual methods of application including spraying, direct rollcoating, reverse rollcoating, electrodeposition, flow coating, and the like. The coating composition is primarily useful for coating aluminum, steel, tin plated steel, electro-galvanized steel, and hot dipped galvanized steel. Such metal substrates are usually cleaned and chemically treated to improve the wetting and adhesion of subsequent organic coatings. The coating compositions of this invention are equally useful for primers or as topcoats deposited over base layers of either the same or different types of resinous compositions. After coating the substrate the coating is cured, preferably by baking for about 5 seconds to about 25 minutes at between about 120° C. and about 315° C. A typical fast bake is for about 40 seconds at about 240° C.–255° C.

The following examples demonstrate the preparation of the polyester resins of this invention and coating compositions containing them, along with performance characteristics of such coatings.

EXAMPLE 1

A ten-gallon reactor was charged with 1100.0 grams of 2-ethyl-2-(hydroxymethyl)-1,3-propanediol, 3845.6 grams of 2,2-dimethyl-1,3-propanediol, 4395.6 grams of 1,6-hexanediol, 12,636.8 grams of 1,3-benzenedicarboxylic acid and 22 grams of dibutyltin oxide. The contents of the reaction vessel were gradually heated to 225° C. while removing the water of reaction through a steam jacketed distillation column. When an acid number of 10.0 was obtained, the resulting polyester was reduced with Hi-Sol 4-1 solvent to afford a material with a final acid number of 9.3 at 60.5% NVM (Non-Volatile Material), a hydroxyl number of 54.6, a Gardner Holdt viscosity of Z3+, a Gardener Color of 1+, and a weight of 8.87 lbs per gallon.

EXAMPLE 2-11

The following tables summarize the compositions and properties of examples of polyesters which were prepared by the same technique as that of Example 1.

TABLE I

| | POLYESTER COMPOSITION, WT. % | | | | | |
|---|---|---|---|---|---|---|
| Example No. | Trihydroxy alkyl* | 1,6-Hexanediol | 2,2-Dimethyl-1,3-propanediol | 1,3-Benzene-dicarboxylic acid | 1,2-Benzene-dicarboxylic anhydride | 1,6-Hexanedioic acid |
| 1 | 5.00 | 20.00 | 17.50 | 57.50 | — | — |
| 2 | 17.58 | 19.53 | 9.18 | 53.71 | — | — |
| 3 | 13.11 | 18.98 | 12.61 | 55.30 | — | — |
| 4 | 8.53 | 19.47 | 15.47 | 56.53 | — | — |
| 5 | 5.00 | 20.00 | 19.80 | 55.20 | — | — |
| 6 | 5.03 | 15.04 | 22.08 | 57.85 | — | — |
| 7 | 2.00 | 20.00 | 20.50 | 45.00 | 12.50 | — |
| 8 | 5.00 | 20.00 | 17.50 | 45.00 | 12.50 | — |
| 9 | 17.79 | 9.88 | 17.98 | 54.35 | — | — |
| 10 | 17.36 | 29.58 | — | 53.05 | — | — |
| 11 | 17.81 | 19.79 | 9.30 | 43.50 | — | 9.6 |

FOOTNOTES:
*Trihydroxyl alkyl component
Examples 1–7, 9–11: 2-ethyl-2-(hydroxymethyl)-1,3-propanediol
Example 8: 2-(hydroxymethyl)-2-methyl-1,3-propanediol

TABLE II

| | PROPERTIES | | | | |
|---|---|---|---|---|---|
| | | | Molecular Weight* | | |
| Example No. | Acid Value | Hydroxyl Value | Number Avg | Weight Avg | Tg, °C.** |
| 1 | 9.3 mg KOH/gm | 54.6 mg KOH/gm | 2678 | 10620 | −6 |
| 2 | 4.0 | 148.9 | 1766 | 10750 | −6 |
| 3 | 7.3 | 110.7 | 1844 | 9529 | −5 |
| 4 | 8.2 | 79.5 | 2851 | 10720 | −6 |
| 5 | 5.8 | 95.9 | 1554 | 4224 | — |
| 6 | 7.7 | 55.4 | 2928 | 10660 | +24 |
| 7 | 4.7 | 38.2 | 2295 | 9487 | −8 |
| 8 | 4.1 | 52.0 | 2431 | 9653 | −8 |
| 9 | 4.9 | 147.2 | 1673 | 8702 | −5 |
| 10 | 4.0 | 143.2 | 1844 | 7659 | −13 |
| 11 | 8.9 | 147.2 | 1434 | 6514 | −10 |

FOOTNOTES:
**Determined by Differential Scanning Calorimetry
*Number average and weight average molecular weight as determined by gel permeation chromatography against a polystyrene standard.

EXAMPLE 12

Paint was made from the polyester solution of Example 1 by combining it with 15% of hexamethoxymethylmelamine cross-linker on resin solids, pigmented with TiO₂ pigment at a pigment/resin ratio of 0.9/1, catalyzed with 0.1% on resin solids of a 20% pTSA solution and reduced to 68.4% NVM with isophorone and Solvesso 100. This paint was applied on Bonderite 901 treated cold rolled steel panels at 0.9 mils dry film thickness and baked at 226° C. for 40 seconds. The cured coating showed a 95 gloss, an H to 2H pencil hardness and passed a 0 T-Bend and 190 inch/lb reverse impact with no microfractures or loss of Scoth tape adhesion. Stain resistance of this paint was excellent when tested with iodine, mustard, shoe polish, lipstick, catsup, and chlorox, which are typcial reagents used to test appliance coatings.

The gloss was determined in accordance with ASTM Designation D-523-67, the reverse impact resistance according to ASTM Designation D-2794-69 and adhesion via ASTM Designation D-3359-76. The other test procedures were as follows:

Fabrication 180° Bend (0 T-Bend)—The panel is manually bent into a U-shape. A number of thicknesses of the substrate (in this case, no thicknesses or 0T) are placed in the bend area and the entire assembly is placed in the jaws of a press and pressed. Scotch tape is applied across the bend and removed quickly. The adhesion of the coating after bending is rated on a scale of 0 to 10 with 10 representing perfect, i.e., no coating was pulled off with the tape.

Pencil Hardness Test—A set of pencils ranging from 6B (soft) to 6H (hard) are used, starting with the hard end of the set. These pencils are pushed in turn into the film. The first pencil which crumbles instead of penetrating indicates the pencil hardness.

MEK Double Rubs—A pad of felt (2" square) soaked in MEK (methyl ethyl ketone) is rubbed back and forth across the coated surface, while the panel is resting on a firm surface. Each stroke is 2.5" in length at a uniform pressure of about 900 grams and at a rate of about 100 rubs per minute. The pad is resoaked with MEK after 50 double rubs, or before if increase in friction makes it necessary. One double rub is considered as one back and forth stroke. Fifty double rubs should only slightly dull the surface in the center area of the rub.

Stain Resistance—One ml of reagent is placed on a coated panel and covered with a watch glass for 96 hours. Then the watch glass is removed and the panel is washed with soap and water and the degree of staining is rated versus a high quality appliance coating used on refrigerators as a control.

EXAMPLE 13

A portion of the polyester resin solution of Example 2 was combined with 16% on resin solids of a hexamethoxymethylmelamine crosslinker, pigmented with $TiO_2$ at a pigment/binder ratio of 0.9/1, catalyzed with 0.25% on resin solids of a 20% pTSA solution and reduced to 67.7% NVM with Cellosolve Acetate and Solvesso 100. At this reduction the paint viscosity was 40–50 seconds #4 Zahn Cup. It was applied at 0.8 mils dry film thickness on 20 mil Bonderite 901 treated cold rolled steel panels and baked at 266° C. for 40 seconds. The cured coating showed 4H to 5H pencil hardness, passed a 5T-Bend with no microfracture or loss of Scotch tape adhesion. Stain resistance of this paint was excellent when tested with iodine, mustard, shoe polish, lipstick, catsup and chlorox.

EXAMPLE 14

A portion of the polyester resin solution from Example 2 was combined with 30% on resin solids of a hexamethoxymethylmelamine crosslinker, pigmented with $TiO_2$ solution, and reduced to 70.1% NMV with Cellosolve Acetate and Solvesso 100. This paint was applied at 0.8 mils dry film thickness on 20 mil Bonderite 901 cold rolled steel and baked 40 seconds at 254° C. or 213° C. peak metal temperature. The cured coating showed an 85 gloss, greater than 100 MEK double rubs, a 2H to 3H pencil hardness, and passed a 4T-Bend and 80 inch/lb reverse impact with no cracks or loss of Scotch tape adhesion. Stain resistance of this paint was excellent when tested with the reagents mentioned above.

EXAMPLE 15

A portion of the polyester resin from Example 3 was made into a white paint by using 15% hexamethoxymethylmelamine as a crosslinker based on resin solids, 0.2% of a 20% solution of pTSA as a catalyst, and pigmenting it with $TiO_2$ at a pigment/binder ratio of 0.9/1. This paint was reduced to 35–40 seconds #4 Zahn Cup and 68.1% NVM with Solvesso 100 and Cellosolve Acetate. It was applied at 0.9 mils dry film thickness on 20 mil cold rolled steel panels treated with Bonderite 901 and baked at 266° C. for 40 seconds. When tested this coating showed a Knoop Hardness Number of 20.7, greater than 100 MEK double rubs, and passed an 80 inch/lb reverse impact and 5T-Bend with no cracks or loss of Scotch tape adhesion.

EXAMPLE 16

The polyester resin solution from Example 4 was formulated into a paint by combining it with 15% of hexamethoxymethylmelamine crosslinker, pigmented with $TiO_2$ at a pigment/binder ratio of 0.9/1, catalyzed with 0.2% on resin solids of a 20% pTSA solution and reduced to a viscosity of 36 seconds #4 Zahn Cup and 68.2% NVM with Cellosolve Acetate and Solvesso 100. This coating was applied at 0.85 mils dry film thickness on a 20 mil cold rolled steel panels treated with Bonderite 901 and baked at 266° C. for 40 seconds. The cured coating showed a Knoop Hardness Number (KHN) of 17.9, a gloss of 87, and passed a 4T-Bend and 80 inch/lb reverse impact without showing any microfractures or loss of adhesion when tested with Scotch tape.

EXAMPLE 17

The resin solution from Example 5 was made into a high solids paint by blending it with 20% hexamethoxymethylmelamine, pigmenting it with $TiO_2$ at a pigment/binder ratio of 0.8/1 and reducing it to 80.2% NVM with Cellosolve Acetate, plus 1.0% on resin solids of a 20% pTSA solution. This coating was checked for film properties by applying it at 0.85 mils dry film thickness on 20 mil cold rolled steel panels treated with Bonderite 901 and baking 266° C. for 40 seconds. When coated thus the paint showed a gloss of 88, pencil hardness of 2H to 3H and passed an 80 inch/lb reverse impact plus Scotch tape with no loss of adhesion.

EXAMPLE 18

A 5 liter glass reactor was charged with 200.0 grams of 2-ethyl-2-(hydroxymethyl)-1,3-propanediol (TMP), 920.0 grams of 2,2-dimethyl-1,3-propanediol (NPG), 800.0 grams of 1,6-hexanediol, 2080.0 grams of 1,3-benzenedicarboxylic acid (IPA) and 4.0 grams of dibutyltin oxide. The contents of the reaction veseel were gradually heated to 225° C. while removing the water of reaction through a steam jacketed distillation column. When an acid number of 5.5 was obtained, the resulting polyester was reduced with methyl propyl ketone to afford a material with a final acid number of 4.3 at 80% NVM, a hydroxyl number of 162, and a Gardner Holt viscosity of Z–Z1.

EXAMPLES 19 AND 20

The following table contains examples of two additional polyesters which were prepared by the same technique as that of Example 18.

TABLE III

| Example | Composition, Wt. % | | | | | Properties | | | |
| --- | --- | --- | --- | --- | --- | --- | --- | --- | --- |
| | TMP | 1,6-Hexanediol | NPG | IPA | PA* | A.N. | Hyd.N. | Mn | Mw |
| 18 | 5.0 | 20.0 | 23.0 | 52.0 | — | 4.3 | 162 | 1027 | 2136 |
| 19 | 8.5 | 19.5 | 20.4 | 51.6 | — | 4.0 | 179 | 993 | 2212 |
| 20 | 8.7 | 20.1 | 21.0 | 26.5 | 23.7 | 6.3 | 180 | 807 | 1806 |

*1,2-Benzenedicarboxylic acid (PA)

EXAMPLE 21

The polyester solution from Example 18 was combined with 50% of hexamethoxymelamine crosslinker (Cymel 303) on resin solids, pigmented with TiO$_2$ pigment at a pigment/resin mol ratio of 1/1, ctalyzed with 3% of a 20% pTSA solution and reduced to 80% total non-volatile with n-butyl acetate. This coating had a viscosity of 34" #4 Ford Cup. It was applied to 20 gauge Bonderite 1000 treated steel panels at 1.0 to 1.1 mils dry film thickness and baked at 121° C. for 20 minutes. The baked coating showed a 3H to 4H pencil hardness, a 60° gloss of 73, and passed a 28 in.-lb. reverse impact with no cracking or loss on scotch tape adhesion.

EXAMPLE 22

The polyester solution from Example 19 was combined with 35% on resin solids of a partially alkylated melamine-formaldehyde crosslinker (Uformite 27-806) on resin solids, pigmented with TiO$_2$ pigment at a pigment/resin ratio of 1/1 and reduced to 80% total nonvolatile with n-butyl acetate. This paint had a viscosity of 126" #4 Ford cup or 620 cps. When applied on 20 gauge Bonderite 1000 treated steel panels and baked at 135° C. for 20 minutes it showed a 60° gloss greater than 70, a 2H to 3H pencil hardness, and had excellent stain resistance to tincture of iodine, black shoe polish, and yellow mustard.

EXAMPLE 23

The polyester resin solution from Example 20 was combined with 50% of hexamethoxymethylmelamine (Cymel 303) on resin solids, pigmented with TiO$_2$ pigment at a pigment/resin ratio of 1/1, catalyzed with 3% of a 20% pTSA solution and reduced to 80% total non-volatile with n-butyl acetate. This white paint had a viscosity of 35" #4 Ford Cup. When applied to 20 gauge Bonderite 2000 treated steel panels and baked at 121° C. for 20" at 1.0 to 1.1 mils dry film thickness, the panel showed a 60° C. gloss of 81, a pencil hardness of 3H to 4H, and only a few microcracks on a 28 in.-lb. reverse impact.

Although the present invention has been described with reference to preferred embodiments, it is to be understood that modifications and variations may be resorted to without departing from the spirit and scope thereof, as those skilled in the art will readily understand. Such modifications and variations are considered to be within the purview and scope of the appended claims.

We claim:
1. A thermosettable polyester resin derived from a reaction mixture comprising:
   (a) between about 40 percent and about 60 percent by weight of a benzenedicarboxylic acid component;
   (b) between about 2 percent and about 18 percent by weight of a trihydroxy alkyl component;
   (c) between about 9 percent and about 23 percent by weight of a short chain alkylene diol component having four or fewer carbon atoms in the primary carbon chain between the hydroxyl moieties;
   (d) between about 9 percent and about 30 percent by weight of a dihydroxy alkyl compound having four to ten carbon atoms in the primary carbon chain between the hydroxyl moieties; and
   (e) from 0 percent to about 10 percent by weight of an alkyl dicarboxylic acid component;
   (f) said polyester resin having a number average molecular weight of from about 400 to about 5000, a combined acid and hydroxyl value of about 40 to about 250 milligrams of KCH per gram of polyester, and a glass transition temperature of about −15° to +25° C.

2. A polyester resin as defined in claim 1 wherein said resin has a number average molecular weight of from about 400 to about 1400, a combined acid and hydroxyl value of about 50 to about 250 milligrams of KOH per gram of polyester, and a glass transition temperature of about −15° to +25° C.

3. A polyester resin as defined in claim 1 wherein said resin has a number average molecular weight of from about 1400 to about 5000, a combined acid and hydroxyl value of about 40 to about 160 milligrams of KOH per gram of polyester, and a glass transition temperature of about −15° to +25° C.

4. The polyester resin of claim 1, 2 or 3 wherein the benzenedicarboxylic acid component (a) comprises 1,3-benzenedicarboxylic acid.

5. The polyester resin of claim 1, 2 or 3 wherein the benzenedicarboxylic acid component (a) comprises a mixture of 1,3-benzenedicarboxylic acid with 1,2-benzenedicarboxylic anhydride or acid.

6. The polyester resin of claim 1, 2 or 3 wherein each of the hydroxy groups in the trihydroxy alkyl component (b) is attached to a terminal carbon atom.

7. The resin of claim 6 wherein the trihydroxy alkyl component (b) comprises a 2-ethyl-2-(hydroxymethyl)-1,3-propanediol.

8. The resin of claim 6 wherein the trihydroxy alkyl component (b) comprises 2-(hydroxymethyl)-2-methyl-1,3-propanediol.

9. The polyester resin of claim 1, 2 or 3 wherein the alkylene diol component (c) comprises 2,2-dimethyl-1,3-propanediol.

10. The polyester resin of claim 1, 2 or 3 wherein the alkylene diol component (c) comprises 2,2-dimethyl-1,3-propanediol in admixture with one or more members of the group consisting of: 1,3-butanediol; 1,2-propanediol; and 1,2-ethanediol.

11. The polyester resin of claim 1, 2 or 3 wherein the dihydroxy alkyl compound (d) comprises 1,6-hexanediol.

12. The polyester resin of claim 1, 2 or 3 wherein the alkyl dicarboxylic acid component (e) is 1,6-hexanedioic acid.

13. The polyester resin of claim 1, 2 or 3 derived from 1,3-benzenedicarboxylic acid, 2-ethyl-2-(hydroxymethyl)-1,3-propanediol, 2,2-dimethyl-1,3-propanediol, and 1,6-hexanediol.

14. A coating composition comprising the polyester resin of claim 1 or 3, between about 5 weight percent and about 25 weight percent of an aminoplast crosslinking agent on resin solids, between about 0 and about 1.0 weight percent of an acid catalyst on resin solids, and an inert organic solvent in an amount sufficient to provide a solids content of between about 35 weight percent and about 55 weight percent, based on the weight of the composition.

15. A coating composition comprising the polyester resin of claim 1 or 2, between about 25 weight percent and about 60 weight percent of an aminoplast crosslinking agent on resin solids, between about 0 and 1.0 weight percent of an acid catalyst on resin solids, and an inert organic solvent in an amount sufficient to provide a solids content of between about 55 weight percent and about 100 weight percent, based on the weight of the composition.

16. A coating composition as defined in claim 15 wherein said organic solvent is used in an amount sufficient to provide a solids content of between about 75 and 100 weight percent of said coating composition.

17. A coating composition as defined in claim 14 additionally comprising a pigmenting agent.

18. A coating composition as defined in claim 15 additionally comprising a pigmenting agent.

19. A coating composition as defined in claim 16 additionally comprising a pigmenting agent.

20. A coating composition comprising the polyester resin of claim 13, between about 5 weight percent and about 25 weight percent of an aminoplast crosslinking agent on resin solids, between about 0 and 1.0 weight percent of an acid catalyst on resin solids, and an inert organic solvent in an amount sufficient to provide a solids content of between about 35 weight percent and about 55 weight percent, based on the weight of the composition.

21. A coating composition comprising the polyester resin of claim 13, between about 25 weight percent and about 60 weight percent of an aminoplast crosslinking agent on resin solids, between about 0 and 1.0 weight percent of an acid catalyst on resin solids, and an inert organic solvent in an amount sufficient to provide a solids content of between about 75 and 100 weight percent, based on the weight of the composition.

22. A substrate having a coating of a cured composition as defined in claim 14.

23. A substrate having a coating of a cured composition as defined in claim 15.

24. A substrate having a cured coating composition as defined in claim 16.

25. A substrate having a cured coating composition as defined in claim 20.

* * * * *

UNITED STATES PATENT AND TRADEMARK OFFICE
CERTIFICATE OF CORRECTION

PATENT NO. : 4,238,583

DATED : December 9, 1980

INVENTOR(S) : Michael A. Tobias and Conrad L. Lynch

It is certified that error appears in the above-identified patent and that said Letters Patent are hereby corrected as shown below:

Column 4, line 6, "abou" should be --about--.

Column 7, line 39, "NMV" should be --NVM--.

Column 8, line 43, "veseel" should be --vessel--.

Column 9, line 2, "ctalyzed" should be --catalyzed--.

Signed and Sealed this

Thirty-first Day of August 1982

[SEAL]

Attest:

Attesting Officer

GERALD J. MOSSINGHOFF

Commissioner of Patents and Trademarks